(12) United States Patent
Haijima et al.

(10) Patent No.: US 10,830,987 B2
(45) Date of Patent: Nov. 10, 2020

(54) CAMERA FOR PHOTOGRAMMETRY

(71) Applicant: TOPCON Corporation, Tokyo-to (JP)

(72) Inventors: Yasuhito Haijima, Tokyo-to (JP); Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 220 days.

(21) Appl. No.: 15/868,122

(22) Filed: Jan. 11, 2018

(65) Prior Publication Data

US 2018/0210164 A1 Jul. 26, 2018

(30) Foreign Application Priority Data

Jan. 26, 2017 (JP) .................................. 2017-012045

(51) Int. Cl.
| | | |
|---|---|---|
| *G02B 5/04* | (2006.01) | |
| *G02B 7/18* | (2006.01) | |
| *H04N 5/225* | (2006.01) | |
| *G01C 11/02* | (2006.01) | |
| *B64C 39/02* | (2006.01) | |
| *G03B 15/00* | (2006.01) | |
| *G03B 17/56* | (2006.01) | |

(52) U.S. Cl.
CPC .......... *G02B 7/1805* (2013.01); *B64C 39/024* (2013.01); *G01C 11/02* (2013.01); *G03B 15/006* (2013.01); *G03B 17/565* (2013.01); *H04N 5/2254* (2013.01); *B64C 2201/123* (2013.01); *B64C 2201/127* (2013.01); *B64C 2201/141* (2013.01); *B64C 2201/146* (2013.01)

(58) Field of Classification Search
CPC .. G02B 7/1805; G03B 17/565; G03B 15/006; B64C 39/024; B64C 2201/123; B64C 2201/146; B64C 2201/127; B64C 2201/141; G01C 11/02; H04N 5/2254
See application file for complete search history.

(56) References Cited

U.S. PATENT DOCUMENTS

| | | | | |
|---|---|---|---|---|
| 4,293,185 A | * | 10/1981 | Yamazaki ................ | G02B 7/14 359/422 |
| 6,014,273 A | * | 1/2000 | Hirai ................... | G03B 7/09976 359/819 |
| 9,958,268 B2 | * | 5/2018 | Ohtomo ............... | G01C 15/002 |
| 2011/0182566 A1 | * | 7/2011 | Watanabe ............... | G03B 5/00 396/55 |
| 2014/0371952 A1 | | 12/2014 | Ohtomo et al. | |

FOREIGN PATENT DOCUMENTS

JP          2015-1450 A       1/2015

* cited by examiner

*Primary Examiner* — Euncha P Cherry
(74) *Attorney, Agent, or Firm* — Nields, Lemack & Frame, LLC (57) ABSTRACT

A camera for photogrammerty comprises a camera, a coupling element standardly provided on the camera, an adaptor for attaching a prism which is connectable with the coupling element, and a prism fixed to the adaptor for attaching the prism.

17 Claims, 10 Drawing Sheets

ENTRANCE PUPIL POSITION

CAMERA FOR PHOTOGRAMMETRY

BACKGROUND OF THE INVENTION

The present invention relates to a camera used for photogrammetry, particularly a camera for photogrammetry including a prism for tracking.

Recently, with a development and a spread of a UAV (Unmanned Aerial Vehicle), various devices using the UAV have been proposed.

For instance, mounting a camera on the UAV and performing photogrammetry are proposed.

In a case where photogrammetry in which an antiaircraft beacon is unnecessary or the number of the antiaircraft beacons is decreased is performed, a position (three-dimensional coordinates) where a photo is taken by a camera needs to be surveyed accurately, and an accuracy for measuring a photographing position influences an accuracy of photogrammetry.

As a method of measuring the three-dimensional coordinates of the UAV, there is a method of a measurement by a GNSS device (Global Navigation Satellite System) using a radio wave from an artificial satellite.

It is difficult for the GNSS device to measure a position with high accuracy. Further, there is a problem that a position measurement cannot be performed in an environment where the radio wave from the artificial satellite cannot be received.

Further, as another method for a position measurement of the UAV, there is a method in which a prism is provided on the UAV, a measuring instrument with a tracking function, for instance, a total station is installed at a known point, a position of the prism is measured while tracking the prism by the total station, and the three-dimensional coordinates of the UAV are measured with high accuracy.

In the latter method of the position measurement by the total station, the prism is provided on the UAV, and the camera is also mounted on the UAV separately from the prism. For this reason, based on a positional relationship between the prism and the camera with reference to the UAV, a position measured by the total station needs to be corrected by a calculation.

Further, the camera is attached to/detached from the UAV for acquiring photo data or charging or the like. For this reason, the positional relationship between the camera and the prism is slightly changed.

Therefore, in order to reflect a measurement accuracy of the total station to a calculation result of a camera position, a mutual position accuracy between the prism and the camera needs to be improved when the prism is mounted.

SUMMARY OF THE INVENTION

It is an object of the present invention is to provide a camera for photogrammetry in which a prism for measuring a position of the camera for photogrammetry is mounted on the camera and a mutual position accuracy between the prism and the camera is improved.

To attain the object as described above, a camera for photogrammetry according to the present invention comprises a camera, a coupling element standardly provided on the camera, an adaptor for attaching a prism which is connectable with the coupling element, and a prism fixed to the adaptor for attaching the prism.

Further, in the camera for photogrammetry according to the present invention, the coupling element is a female screw formed on a forward end inner edge surface of a lens holder of the camera, the adapter for attaching the prism is mounted on a forward end of the lens holder via the female screw, the adapter for attaching the prism has a plane surface orthogonal to an optical axis of the camera, and the prism is fixedly attached to the plane surface.

Further, in the camera for photogrammetry according to the present invention, a step-up ring or a step-down ring is screwed with the female screw, and the adaptor for attaching the prism is provided via the step-up ring or the step-down ring.

Further, in the camera for photogrammetry according to the present invention, a plurality of prisms are provided on the plane surface, and the prisms are disposed at an equal angular pitch on a circumference around the optical axis of the camera as a center.

Further, in the camera for photogrammetry according to the present invention, micro prisms are disposed on an entire surface of the plane surface.

Further, in the camera for photogrammetry according to the present invention, the coupling element is a lens holder of the camera, the adapter for attaching the prism has a cylindrical shape fitted with the lens holder, and the prisms are provided in plural at an equal interval on an outer peripheral surface of the adaptor for attaching the prism.

Further, in the camera for photogrammetry according to the present invention, the coupling element is a hot shoe of the camera, the adaptor for attaching the prism has a fitting portion which can be fitted to/detached from the hot shoe and a prism holding plate formed integrally with the fitting portion, and the prism is mounted on the prism holding plate.

Further, in the camera for photogrammetry according to the present invention, the prism holding plate extends toward the forward end of a lens holder, and the prism is provided on a forward end portion of the prism holding plate.

Furthermore, in the camera for photogrammetry according to the present invention, a position of the prism is set so that a reference position of the prism is located just above an entrance pupil position of the camera in a state where the camera is erect.

According to the present invention, the camera for photogrammetry comprises a camera, a coupling element standardly provided on the camera, an adaptor for attaching a prism which is connectable with the coupling element, and a prism fixed to the adaptor for attaching the prism. As a result, the prism and the camera are integrated, the mutual position accuracy between the prism and the camera is improved, and a reference position of the camera can be measured accurately by a measurement of the prism.

BRIEF DESCRIPTION OF THE DRAWINGS

FIG. 11A and FIG. 11B are explanatory drawings to show a second modification of the first embodiment.

DETAILED DESCRIPTION OF THE PREFERRED EMBODIMENT

A description will be given below on embodiments of the present invention by referring to the attached drawings.

Figure 1:
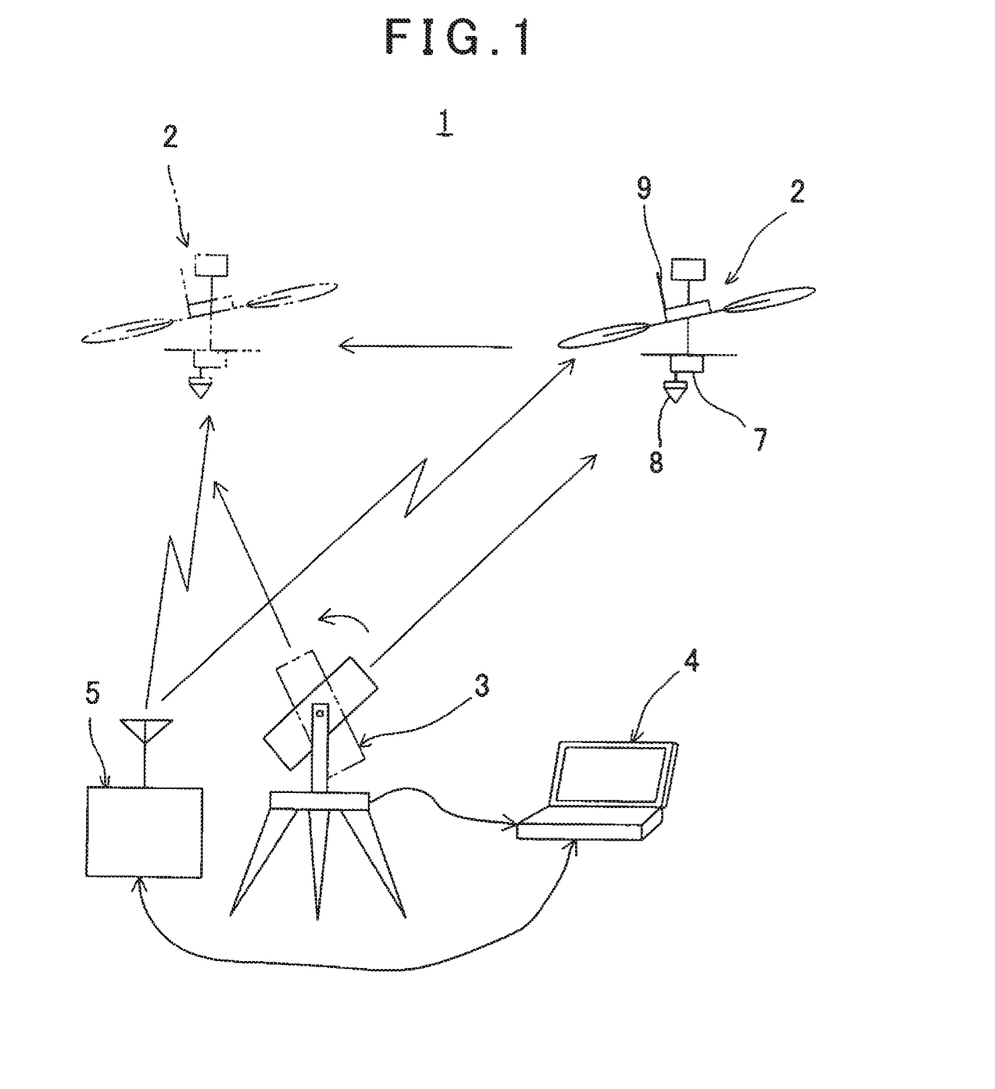
FIG. 1 is a schematical block diagram of a photogrammetry system using an Unmanned Aerial Vehicle (UAV).

FIG. 1 shows general features of an aerial photogrammetry system 1 using a UAV.

In FIG. 1, reference numeral 2 denotes the UAV, reference numeral 3 denotes a measuring instrument with a tracking function such as a total station, for instance, reference numeral 4 denotes a ground base station (an arithmetic device such as a PC or the like, for instance), and reference numeral 5 denotes a communication device performing data communication between the UAV 2 and the total station 3.

A flight of the UAV 2 is controlled by a remote control. Alternatively, the UAV 2 is capable of autonomously flying based on a flight program.

On the UAV 2, a camera 7 for photogrammetry, a prism 8, and a communication device 9 are mounted. It is to be noted that, as the camera 7, a digital camera or a digital video camera which are commercially available can be used.

The camera 7 is supported so that an optical axis of the camera 7 constantly becomes vertical or substantially vertical, and the camera 7 and the prism 8 are provided integrally.

It is to be noted that, if it is configured in such a manner that a tilt sensor for detecting a tilting of the camera 7 is provided and a tilting of the optical axis of the camera 7 is corrected by a calculation based on a detection result of the tilt sensor, the optical axis of the camera 7 does not need to be supported so as to become vertical or substantially vertical.

Image data acquired by the camera 7 is transmitted to the ground base station 4 through the communication device 9 and the communication device 5.

The total station 3 is installed at a known point, sights the prism 8, and measures a position of the prism 8 (three-dimensional coordinates) while tracking the prism 8. Position data acquired by the total station 3 is transmitted to the ground base station 4.

On the ground base station 4, an image acquiring position and the image data are associated from a position measuring timing and an image acquiring timing and further, photogrammetry is performed based on the image acquiring position and the image.

Here, an actual image acquiring position in photogrammetry is not a prism reference position (that is, an optical reference position of the prism) but a reference position of the camera 7 (that is, an entrance pupil position). Therefore, in the calculation in photogrammetry, a positional deviation between the prism reference position and a camera reference position must be considered in the calculation. It is to be noted that the reference position (entrance pupil position) of the camera 7 is located on a lens optical axis 16 (to be described later).

In the present embodiment, it is configured in such a manner that the prism 8 is directly mounted on the camera 7, the camera 7 and the prism 8 are integrated, and a positional relationship between the prism reference position and the camera reference position is fixed.

By referring to FIG. 2 to FIG. 6, a description will be given on a first embodiment of the present invention.

Figure 2:
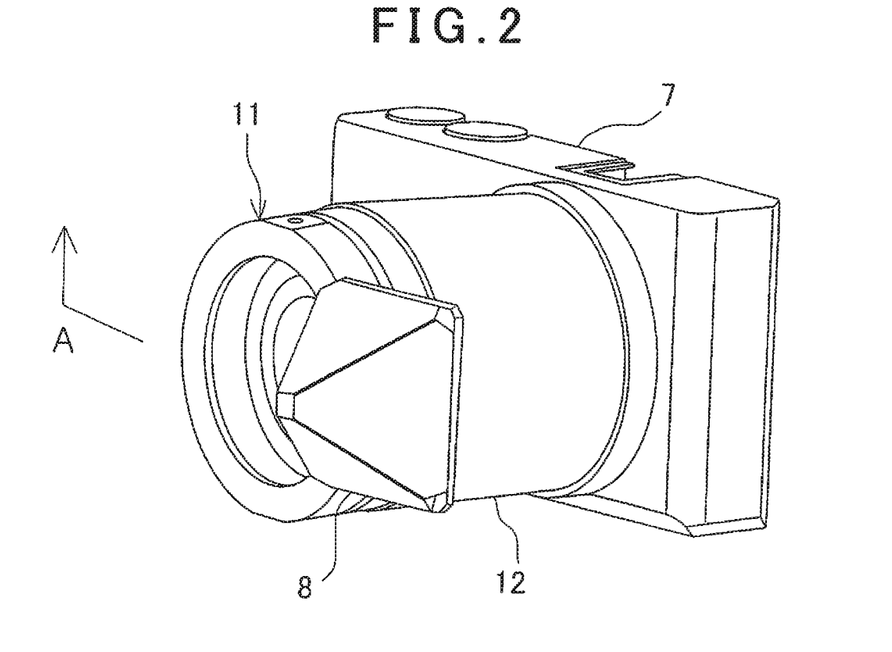
FIG. 2 is a perspective view of a camera for photogrammetry according to a first embodiment of the present invention.

In the first embodiment, one prism 8 is mounted on a lens holder 12.

FIG. 2 shows a state where the prism 8 is mounted on a forward end of the lens holder 12 of the camera 7. On the forward end of the lens holder 12, an adapter 11 for attaching a prism is attached concentrically with the lens holder 12, on the adapter 11 for attaching the prism, the prism 8 is fixedly attached, and the prism 8 is mounted on the forward end of the lens holder 12 via the adapter 11 for attaching the prism.

Figure 3:
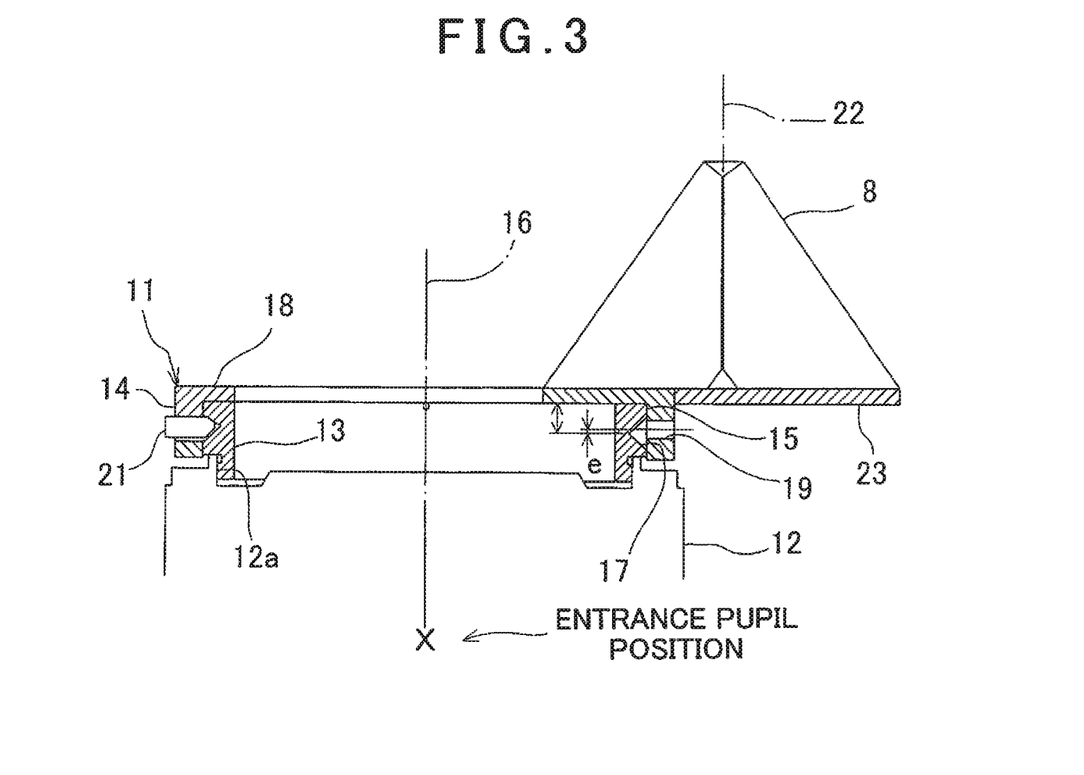
FIG. 3 is an arrow view along line A in FIG. 2.

First, by referring to FIG. 3, a description will be given on the adapter 11 for attaching the prism. It is to be noted that FIG. 3 is an arrow view along line A in FIG. 2.

The adapter 11 for attaching the prism has a ring shape, and the adapter 11 for attaching the prism has an auxiliary ring 13 and a prism holder 14.

On a forward end inner edge surface of the lens holder 12, a female screw 12a for attaching a wavelength filter (not shown), a lens protective filter (not shown) and the like is formed as standard. In the first embodiment, the female screw 12a as standardly comprised in the lens holder 12 is used as a coupling element for mounting the adapter 11 for attaching the prism.

On a base portion of the auxiliary ring 13, a male screw screwed with the female screw 12a is formed, and the male screw functions as a coupling portion of the adapter 11 for attaching the prism.

By screwing and connecting with the male screw and the female screw 12a, the auxiliary ring 13 is fixedly attached to the forward end of the lens holder 12. Further, a forward end portion 15 of the auxiliary ring 13 has a diameter larger or smaller than the male screw. It is to be noted that the drawing shows a case where the forward end portion 15 has the diameter larger than the male screw.

In a state where the auxiliary ring 13 is fixedly attached to the lens holder 12, an end surface on a base side of the forward end portion 15 in the auxiliary ring 13 abuts to a forward end of the female screw 12a, and a position of the auxiliary ring 13 in a direction of the optical axis (lens optical axis 16) of the camera 7 is determined.

The forward end portion 15 protrudes from the female screw 12a, and a V-groove 17 is formed in an outer peripheral surface of the forward end portion 15. Further, the prism holder 14 is arranged so as to externally fit with the forward end portion 15. By externally fitting the forward end portion 15 with the prism holder 14, an axis of the prism holder 14 coincides with the lens optical axis 16.

On a forward end of the prism holder 14, an inner flange 18 extending toward a center is formed. An inner surface of the inner flange 18 is in close contact with a forward end surface of the auxiliary ring 13 (that is, a forward end surface of the forward end portion 15).

In the prism holder 14, a plurality of screw holes 19 or preferably three screw holes 19 are formed at positions trisected in a circumferential direction. The screw holes 19 have screw axes extending in a radial direction of the prism holder 14. Into the V-groove 17, a set screw 21 for fixing the prism holder 14 is threaded.

The screw axis of the screw hole 19 deviates in a direction of the lens optical axis 16 with respect to a center of the V-groove 17. As shown in FIG. 3, the screw axis deviates by e to a forward end side, and when the set screw 21 is tightened, the set screw 21 abuts to a groove slope of the forward end side (side of the prism holder 14) of the V-groove 17. When the set screw 21 is further tightened, a force for pressing the prism holder 14 to the forward end of the auxiliary ring 13 (that is, the forward end portion 15) acts by a component force generated on the groove slope. Further, the component force also functions as a looseness stopper when a vibration or the like acts on the prism holder 14.

The set screw 21 has actions of fixing the prism holder 14 to the auxiliary ring 13 and of accurately positioning in an axial direction. Therefore, the adapter 11 for attaching the prism has high reproducibility in an attachment/detachment of the camera 7.

On the prism holder 14, a prism holding plate 23 extends in the radial direction. A surface of the prism holding plate 23 is orthogonal to the lens optical axis 16 and is flush with a forward end surface of the prism holder 14. The prism holding plate 23 may be formed integrally with the prism holder 14, or the prism holding plate 23 may be attached to the prism holder 14 later. The prism 8 is fixedly attached to the forward end surface of the prism holder 14 while being stretched over between the inner flange 18 and the prism holder 14.

A prism optical axis 22 of the prism 8 is in parallel with the lens optical axis 16. Further, the prism 8 has an optical characteristic that the prism 8 retroreflects all light beams which enter the prism 8 (all light beams enter the prism 8 from the above in FIG. 3).

Therefore, the adapter 11 for attaching the prism can directly fix the prism 8 to the camera 7, and the prism 8 and the camera 7 can be handled as an integrated object. After the prism 8 is attached, the prism reference position and the camera reference position are fixed, respectively. By actually measuring the prism reference position and the camera reference position or by calculating based on a design, the prism reference position and the camera reference position become a known relationship.

Further, in the embodiment as described above, since the prism 8 is directly mounted on the lens holder 12 by the adapter 11 for attaching the prism, in terms of a structure, the prism 8 can be set at a position closest to the camera reference position.

Thus, even if the camera 7 is attached/detached with respect to the UAV 2, the relationship between the prism reference position and the camera reference position is not changed. Further, since the prism 8 is provided at the position closest to the camera reference position, by measuring the prism 8, an accurate photographing position can be obtained.

Figure 5:
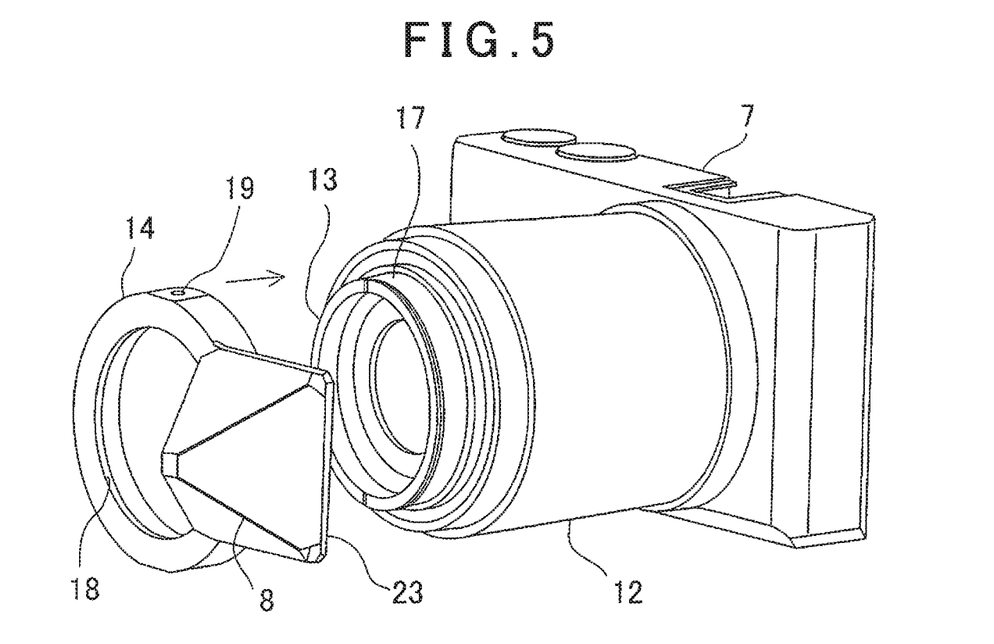
FIG. 5 is a drawing to show the attachment procedure of the prism in the first embodiment.
Figure 6:
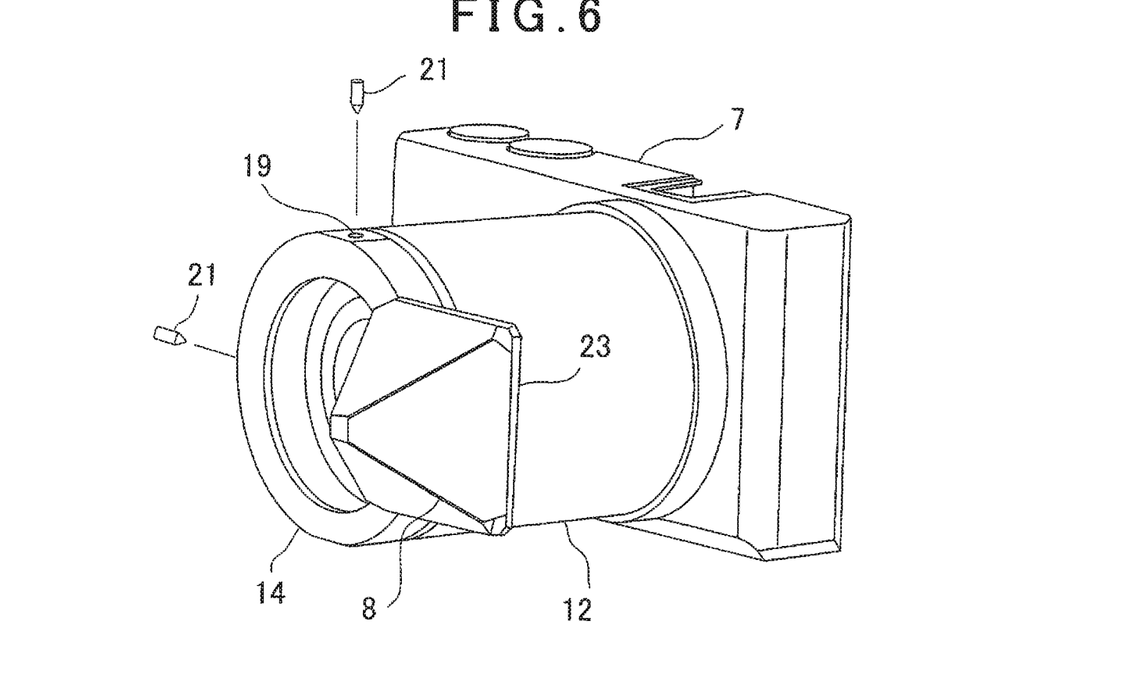
FIG. 6 is a drawing to show the attachment procedure of the prism in the first embodiment.

Next, a description will be given on a procedure of attaching the prism 8 to the camera 7 in FIG. 4 to FIG. 6.

Figure 4:
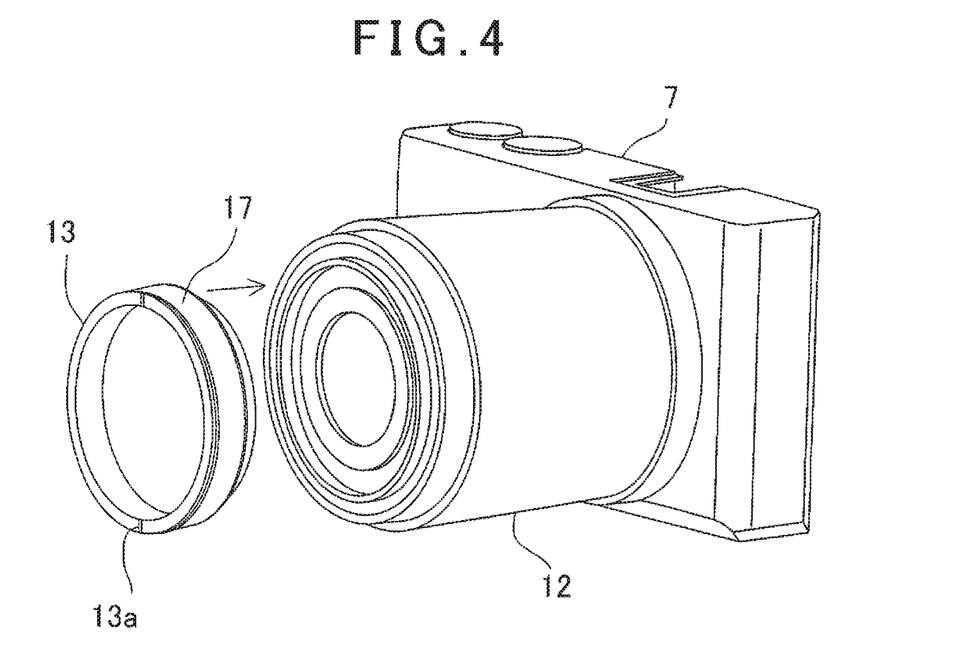
FIG. 4 is a drawing to show an attachment procedure of a prism in the first embodiment.

The auxiliary ring 13 is screwed into the forward end of the lens holder 12 (FIG. 4). It to be noted that, in FIG. 4, reference numeral 13a denotes a slit used in a case where the auxiliary ring 13 is screwed into. The prism holder 14 on which the prism 8 is mounted is fitted with the auxiliary ring 13 (FIG. 5). The prism 8 is positioned in a rotating direction and is fixed by the set screw 21 (FIG. 6). A state where the prism 8 is finally mounted on the camera 7 is shown in FIG. 2.

By referring to FIG. 7 to FIG. 10, a description will be given on a first modification of the first embodiment of the present invention. It is to be noted that, in FIG. 7 to FIG. 10, what are equivalent to components as shown in FIG. 2 to FIG. 6 are referred by the same symbol.

On a lens holder, an attachment/detachment mechanism for attaching/detaching an accessory such as a lens hood or the like is standardly provided. In this attachment/detachment mechanism, for instance, by fitting the lens hood in a forward end of a lens holder 12 and by further rotating the lens hood by a predetermined angle (90°, for instance), the lens hood is mounted on the forward end of the lens holder 12.

In the first modification of the first embodiment, an accessory attachment/detachment mechanism provided in the lens holder 12 is used as a coupling element for mounting an adapter 25 for attaching a prism, and a prism 8 is fixed to the forward end of the lens holder 12.

Figure 7:
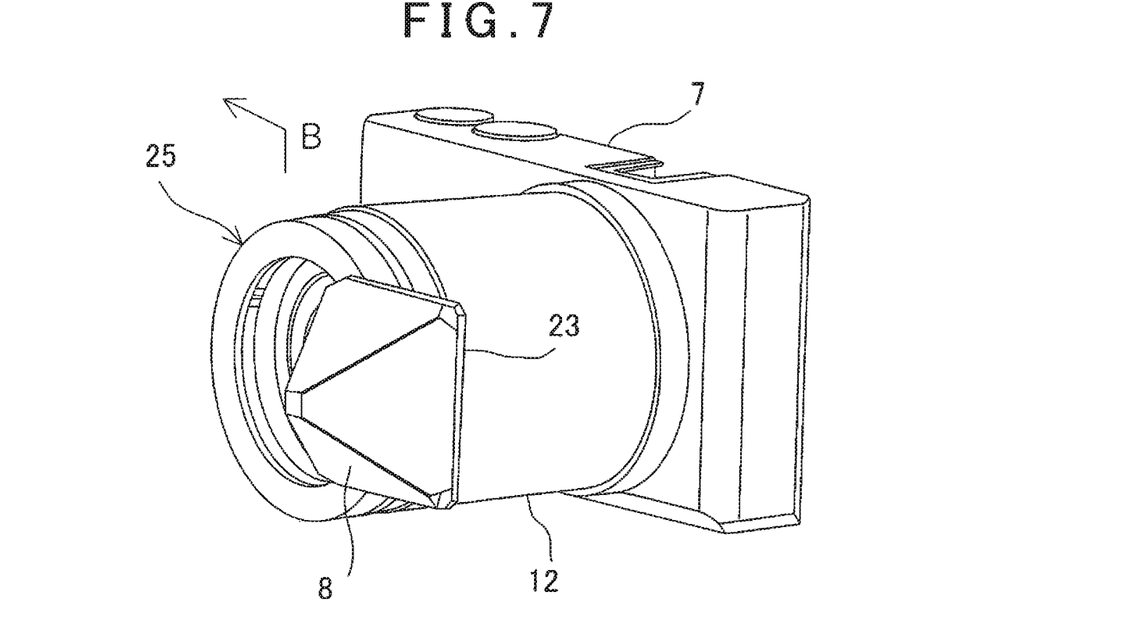
FIG. 7 is a perspective view to show a first modification of the first embodiment of the present invention.

FIG. 7 shows a state where the prism 8 is mounted on the lens holder 12 via the adapter 25 for attaching the prism which has a structure adapted to the accessory attachment/detachment mechanism. The adapter 25 for attaching the prism has a ring shape similarly to an adapter 11 for attaching a prism. Further, the prism 8 is directly fixedly attached to the adapter 25 for attaching the prism, and the adapter 25 for attaching the prism also functions as a prism holder.

Figure 8:
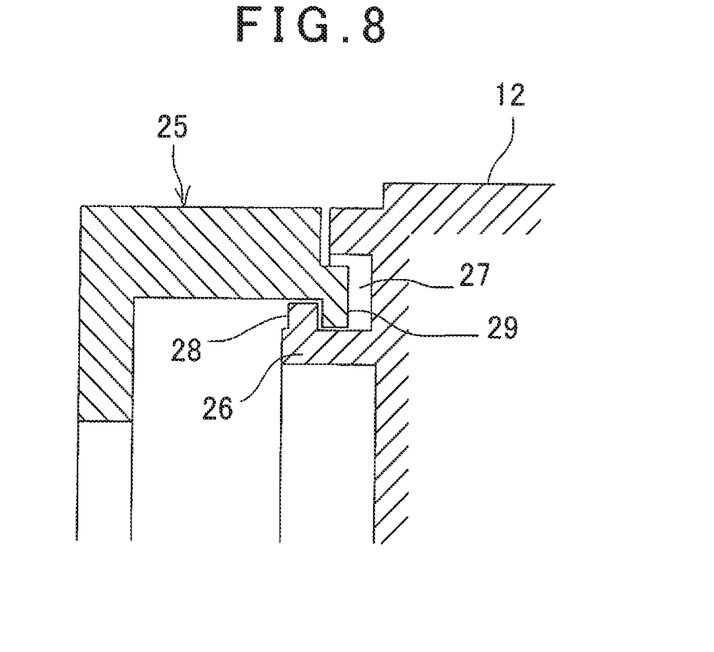
FIG. 8 is an arrow view along line B in FIG. 7.

By referring to FIG. 8, a description will be given on the adapter 25 for attaching the prism. It is to be noted that FIG. 8 is an arrow view along line B in FIG. 7.

On a forward end surface of the lens holder 12, a cylindrical edge portion 26 around a lens optical axis as a center is formed, and an annular groove 27 is formed around the cylindrical edge portion 26. On a forward end outer peripheral surface of the cylindrical edge portion 26, an engagement protruding piece 28 is formed so as to protrude toward the annular groove 27. Further, the engagement protruding pieces 28 are provided in plural at an interval as required.

On a surface of the adapter 25 for attaching the prism, which confronts the lens holder 12, an engagement annular portion 29 having a hook-shaped section is protruded. The engagement annular portion 29 is capable of being fitted with the annular groove 27.

An inner diameter of the engagement annular portion 29 is capable of being fitted with the cylindrical edge portion 26 without a gap. Further, the engagement annular portion 29 has a notch part (not shown) which the engagement protruding piece 28 can pass through.

Therefore, by making the engagement protruding piece 28 abut to the notch part, the engagement annular portion 29 can be fitted with the annular groove 27. Further, by rotating the adapter 25 for attaching the prism, the engagement protruding piece 28 is engaged with the engagement annular portion 29, and the adapter 25 for attaching the prism can be connected with the lens holder 12. The engagement annular portion 29 functions as a coupling portion corresponding to the coupling element.

It is to be noted that a positioning of the adapter 25 for attaching the prism with respect to the lens holder 12 is performed as described below, for instance.

A leaf spring (not shown) is mounted on the annular groove 27, the engagement annular portion 29 is pressed to the engagement protruding piece 28 by the leaf spring. Further, by providing a stopper in the annular groove 27 and by restricting a rotation, the positioning of the adapter 25 for attaching the prism in an optical axis direction and in a rotating direction with respect to the lens holder 12 can be performed.

In the first modification of the first embodiment, although the prism 8 is provided on the adapter 25 for attaching the prism, a mounting of the prism 8 can be performed similar to the first embodiment. For instance, the prism holding plate 23 is provided on the adapter 25 for attaching the prism, and the prism 8 is fixedly attached to the prism holding plate 23. The prism 8 and the adapter 25 for attaching the prism are integrated, and by attaching the adapter 25 for attaching the prism to the lens holder 12, a positioning of the prism 8 with respect to the lens holder 12 is performed.

Figure 9:
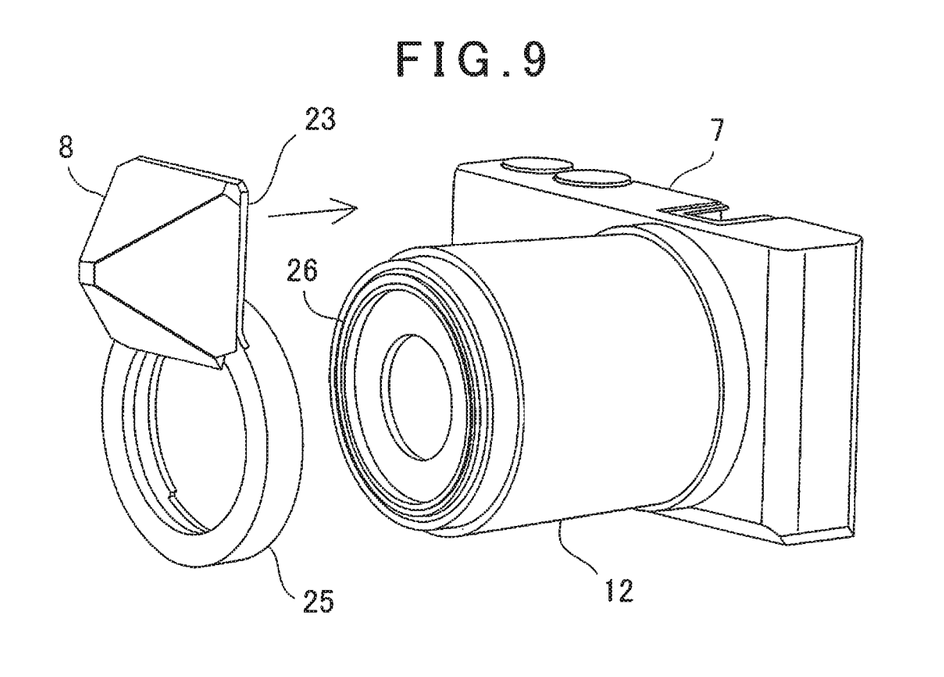
FIG. 9 is a perspective view to show the first modification of the first embodiment of the present invention.
Figure 10:
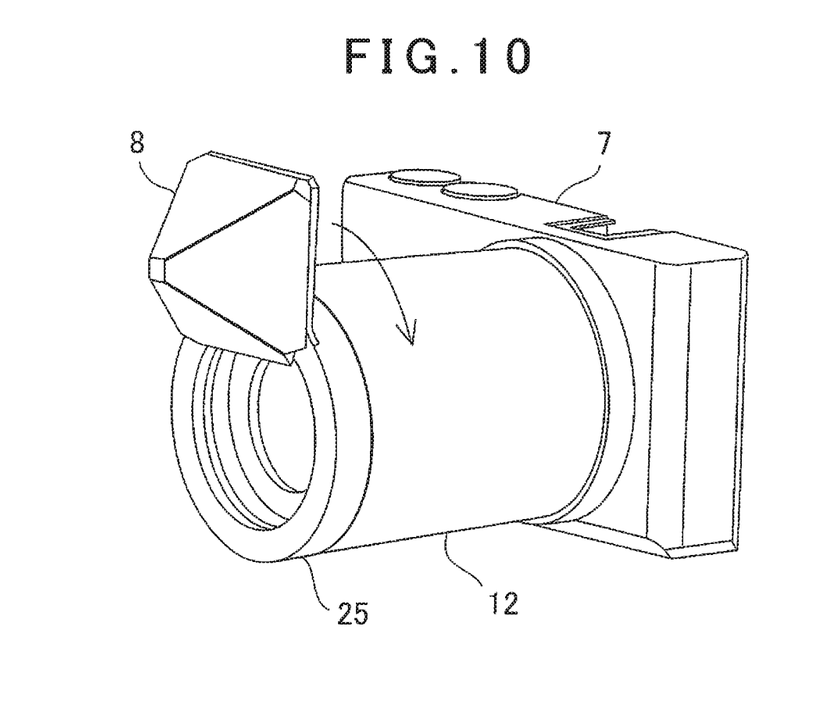
FIG. 10 is a drawing to show the attachment procedure of the prism in the first modification.

FIG. 9 and FIG. 10 show an attachment procedure of the prism 8 to a camera 7 in the first modification of the first embodiment.

By making the engagement protruding piece 28 abut to the notch part, the adapter 25 for attaching the prism is fitted in the annular groove 27 (FIG. 9). Next, the adapter 25 for attaching the prism is rotated, and the adapter 25 for attaching the prism and the annular groove 27 are locked (FIG. 10). A locked state is shown in FIG. 7.

The prism 6 is integrated with the adapter 25 for attaching the prism, by attaching the adapter 25 for attaching the prism to the lens holder 12 by using the accessory attachment/detachment mechanism (that is, the annular groove 27, the engagement protruding piece 28), the prism 8 is integrated with the camera 7. Further by using the accessory attachment/detachment mechanism, a high attachment/detachment reproducibility in an attachment/detachment of the prism 8 to and from the lens holder 12 can be obtained.

Figure 11A:
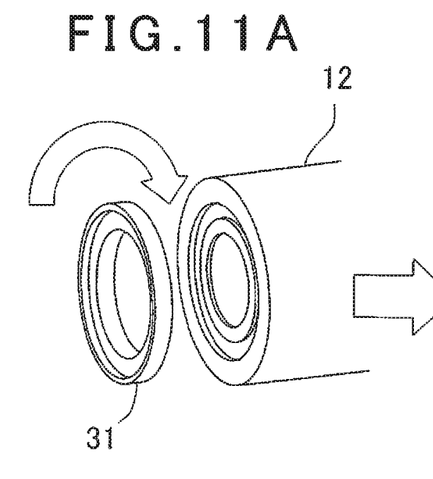
FIG. 11A is an explanatory drawing when a step-up ring is attached to a lens holder.
Figure 11B:
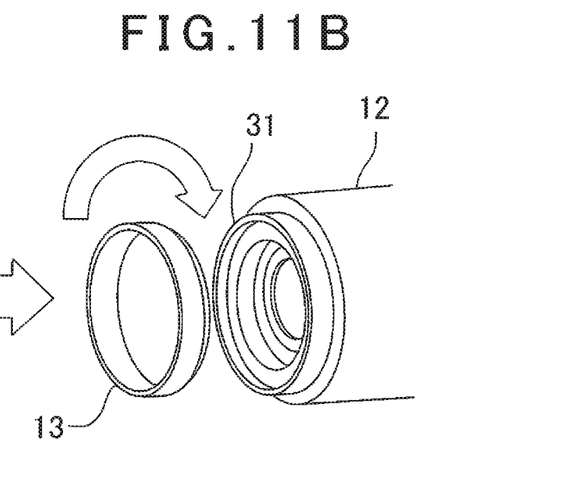
FIG. 11B is an explanatory drawing when an auxiliary ring is attached via the step-up ring.

FIG. 11A and FIG. 11B show a second modification of the first embodiment.

All lens holders 12 do not necessarily have a female screw with the same diameter due to a difference in an aperture of a lens and the like. Therefore, it would suffice if a male screw of an auxiliary ring 13 is manufactured so as to be adapted to a female screw of the lens holder 12.

On the other hand, in cameras and lens units which are commercially available, a step-up ring or a step-down ring for adjusting a diameter is prepared so that a general purpose wavelength filter and a general purpose lens hood can be attached. Therefore, by using this step-up ring or step-down ring, the auxiliary ring 13 can be attached to the lens holder 12 with a different aperture.

In FIG. 11A and FIG. 11B, reference numeral 31 denotes a step-up ring.

The step-up ring 31 has a male screw to be screwed with the female screw of the lens holder 12. By connecting the male screw and the female screw, the step-up ring 31 is attached to the lens holder 12.

The step-up ring 31 has a female screw adapted to the male screw of the auxiliary ring 13 and makes the auxiliary ring 13 be screwed with the step-up ring 31 and mounts the auxiliary ring 13 on the step-up ring 31.

On the auxiliary ring 13, a prism holder 14 can be mounted (see FIG. 5), and a prism 8 can be mounted on the lens holder 12 via the auxiliary ring 13 and the step-up ring 31.

Figure 12:
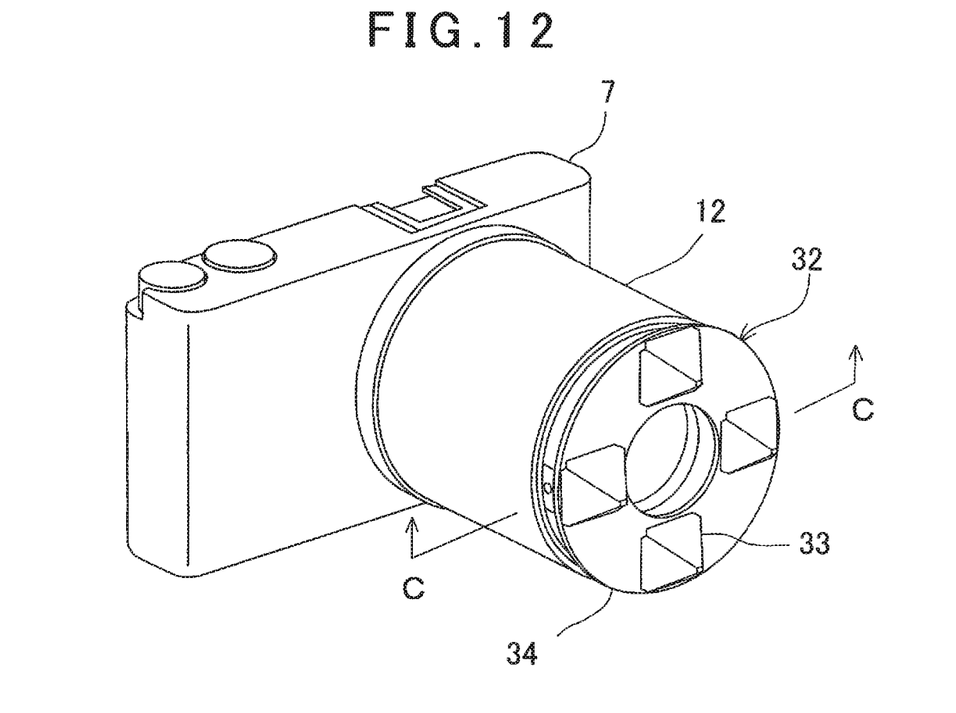
FIG. 12 is a perspective view of the camera for photogrammetry according to a second embodiment of the present invention.
Figure 13:
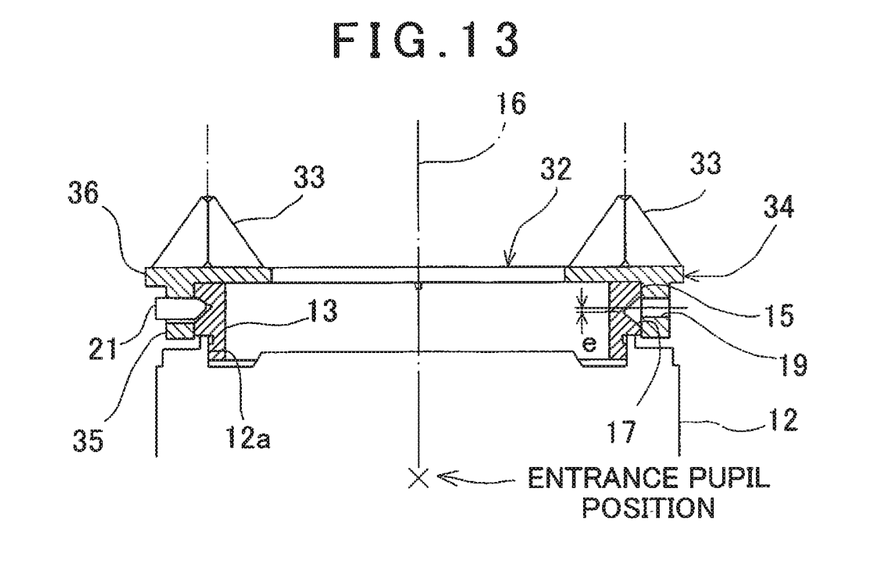
FIG. 13 is an arrow view along line C-C in FIG. 12.

FIG. 12 and FIG. 13 show a second embodiment. In FIG. 12 and FIG. 13, what are equivalent to components as shown in FIG. 2 and FIG. 3 are referred by the same symbol.

The second embodiment shows a case where a plurality of small prisms 33 is mounted on a lens holder 12.

In the second embodiment, also, in a case where the small prisms 33 are mounted on the lens holder 12, an adapter 32 for attaching a prism is used.

The adapter 32 for attaching the prism has an auxiliary ring 13 and a prism holder 34 similarly to the first embodiment.

The auxiliary ring 13 is screwed with a forward end of the lens holder 12. The prism holder 34 is externally fitted with the auxiliary ring 13, and the prism holder 34 is fixed to the auxiliary ring 13 by a set screw 21.

The prism holder 34 has a holder fitting portion 35 which is fitted with the auxiliary ring 13 and a ring-shaped flange portion 36 formed on a forward end of the holder fitting portion 35.

The flange portion 36 is orthogonal to an optical axis of a camera 7 (lens optical axis 16), and the small prisms 33 are fixedly attached in plural (four prisms in the drawing) to the flange portion 36. The small prisms 33 are fixedly attached at positions in which a circumference is divided into a plurality of equal parts (four equal parts in the drawing) on the circumference around an axis of the lens holder 12 as a center. A prism optical axis of each of the small prisms 33 and the lens optical axis 16 are in parallel with each other.

Each of the small prisms 33 and a reference position of the camera 7 (entrance pupil position) are in a known relationship. Further, even if the adapter 32 for attaching the prism is attached/detached, a reproducibility of the relationship between each of the small prisms 33 and the reference position of the camera 7 is ensured.

A total station 3 (see FIG. 1) projects a distance measuring light toward the small prisms 33, receives a reflection light from the small prisms 33 and carries out a distance measurement.

The total station 3 can obtain a position closer to the entrance pupil position by obtaining a barycentric position of the reflection light from the small prisms 33. Further, in a case where the total station 3 can perform the distance measurement of each of the small prisms 33, respectively, by averaging distance measurement results, a measurement accuracy is improved. Further, a central position of the circumference on which the small prisms 33 are provided can be obtained based on individual measurement results.

As a structure for mounting the prism holder 34 to the lens holder 12, an accessory attachment/detachment mechanism shown in FIG. 8 may be used. Further, it is needless to say that a step-up ring or a step-down ring shown in FIG. 11 may be used.

Figure 14:
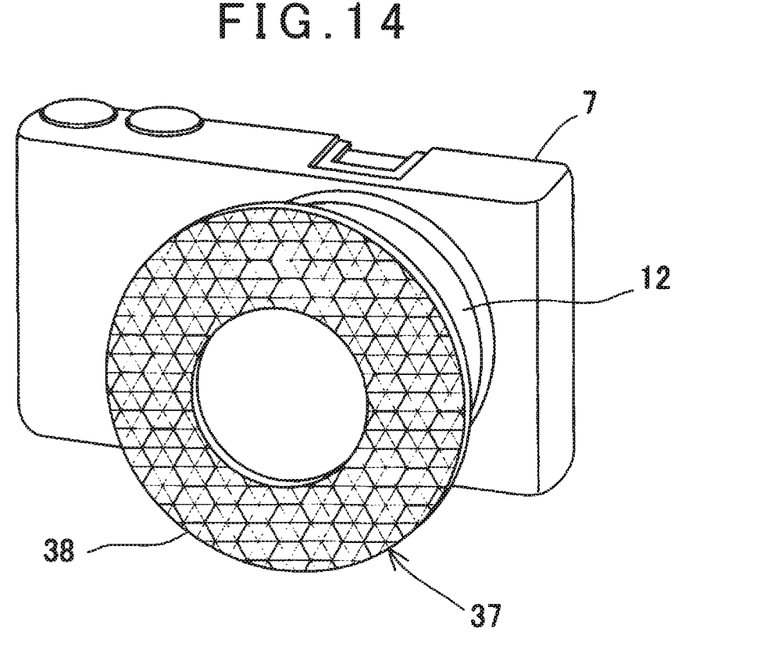
FIG. 14 a perspective view of the camera for photogrammetry according to a third embodiment of the present invention.

FIG. 14 shows a third embodiment. In FIG. 14, what are equivalent to components as shown in FIG. 2 and FIG. 12 are referred by the same symbol.

In the third embodiment, a prism holder 37 has a shape equal to a shape of a prism holder 34, and a forward end surface of the prism holder 37 is orthogonal to an optical axis of a camera 7. In the prism holder 37, instead of small prisms 33, micro prisms 38 further smaller than the small prisms 33 are provided on an entire surface of the forward end surface of the prism holder 37 in a close contact state. The prism holder 37 is constituted as a ring-shaped retroflection plate.

In the third embodiment, also, a total station 3 carries out a measurement of each of the micro prisms 38 and obtains an average value of distance measurement results. By obtaining the average value, similarly to the second embodiment, a center of the prism holder 37, that is, a position of the optical axis of the camera 7 can be measured. Further, the total station 3 can obtain a position closer to an entrance pupil position. Further, instead of the micro prisms, by using a reflection plate made of a resin, the measurement can be executed more inexpensively.

Figure 15:
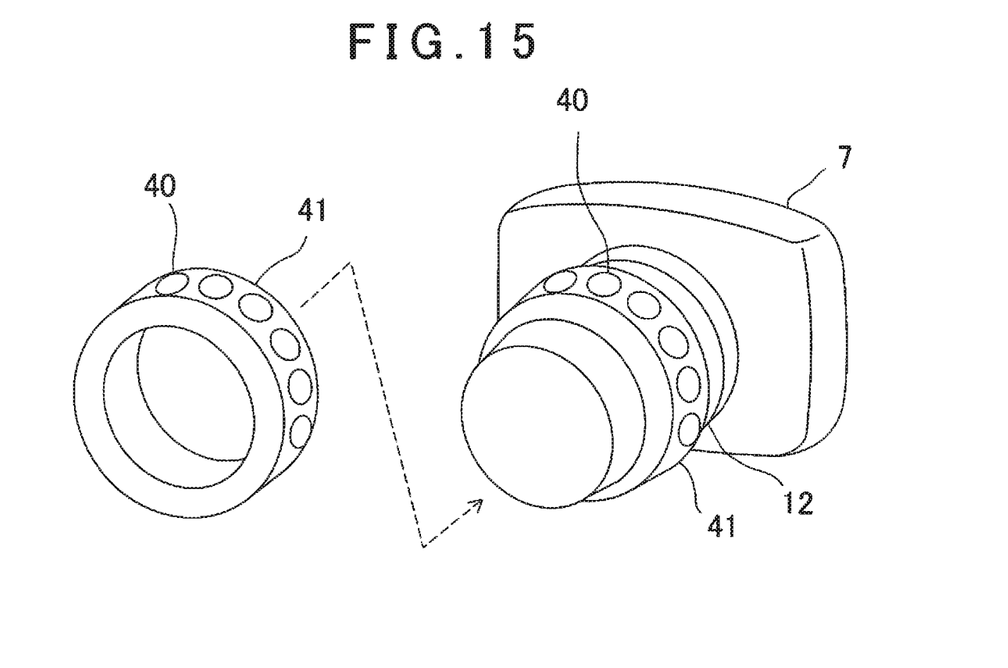
FIG. 15 is a perspective view of the camera for photogrammetry according to a fourth embodiment of the present invention.

FIG. 15 shows a fourth embodiment.

In the fourth embodiment, a prism holder 41 which also serves as both an adapter for attaching a prism and a prism holder has a cylindrical shape, and small prisms 40 are provided on an outer peripheral surface of the prism holder 41 at an equal interval (equal angular pitch).

In the fourth embodiment, a lens holder 12 itself functions as a coupling element. The prism holder 41 is fitted with the lens holder 12, and the prism holder 41 and the lens holder 12 are integrated. It is to be noted that, in FIG. 15, a state where the prism holder 41 is detached from the lens holder 12 and a state where the prism holder 41 is attached to the lens holder 12 are shown, respectively.

In the fourth embodiment, since the small prisms 40 are provided on a cylindrical surface over a total circumference, an aggregate of the small prisms 40 functions as an omnidirectional prism. Further, the small prisms 40 are located at equal distances from an optical axis of a camera 7, and further, the small prisms 40 are in a state provided at positions close to the optical axis of the camera 7.

Therefore, a measurement can be performed from all directions with respect to the camera 7, and further, since an offset amount of the small prisms 40 with respect to the optical axis of the camera 7 is small and known, the measurement can be performed with high accuracy.

Figure 16:
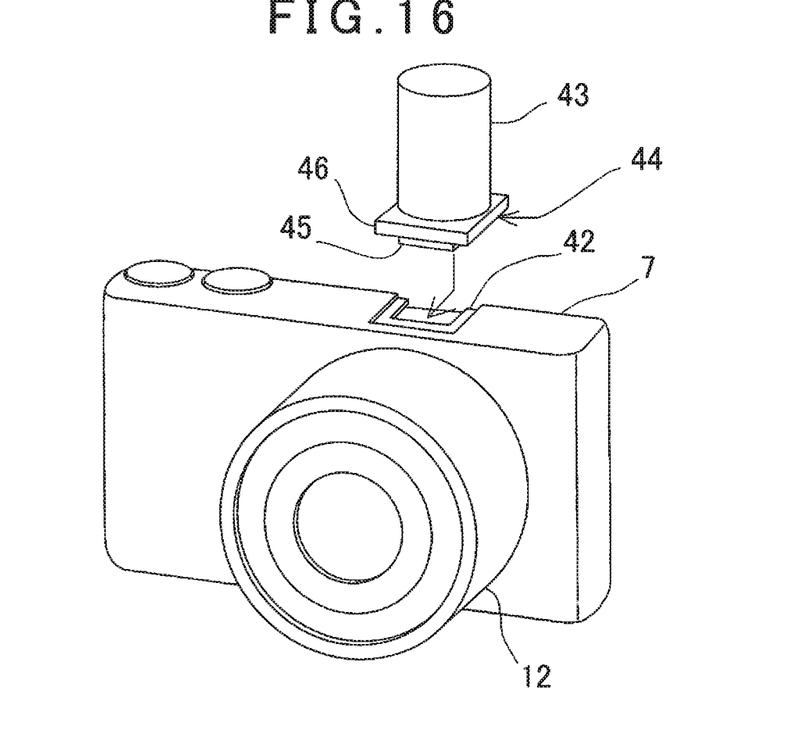
FIG. 16 is a perspective view of the camera for photogrammetry according to a fifth embodiment of the present invention.
Figure 17:
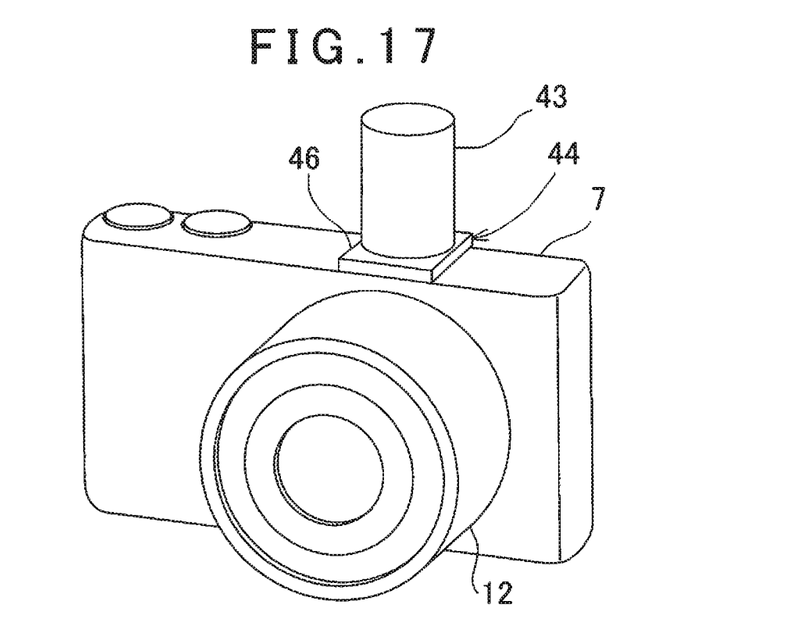
FIG. 17 is a perspective view of the camera for photogrammetry according to the fifth embodiment of the present invention.

FIG. 16 and FIG. 17 show a fifth embodiment.

In the fifth embodiment, a hot shoe 42 standardly equipped in a camera 7 is used as a coupling element. An adapter 44 for attaching a prism is mounted on the hot shoe 42, and a prism 43 is mounted on the camera 7 via the adapter 44 for attaching the prism.

The adapter 44 for attaching the prism is constituted by a fitting portion 45 which can be fitted to/detached from the hot shoe 42 and a prism holding plate 46 constituted integrally with the fitting portion 45. The prism 43 is fixedly attached to the prism holding plate 46.

By fitting the fitting portion 45 with the hot shoe 42, the prism 43 is attached to the camera 7. In this state, a reference position of the prism 43 and an optical axis of the camera 7 or an entrance pupil position are in a known relationship.

By using the hot shoe 42, the prism 43 can be easily attached to the camera 7 by the adapter 44 for attaching the prism with a simple structure. Further, since the prism 43 is attached by fitting between the hot shoe 42 and the fitting portion 45, the prism 43 can be attached to/detached from the camera 7 with high accuracy.

In a case of the fifth embodiment, as the prism 43, an omnidirectional prism or a pyramidal prism is preferably used.

It is to be noted that FIG. 17 shows a state where the prism 43 is attached to the camera 7.

Figure 18:
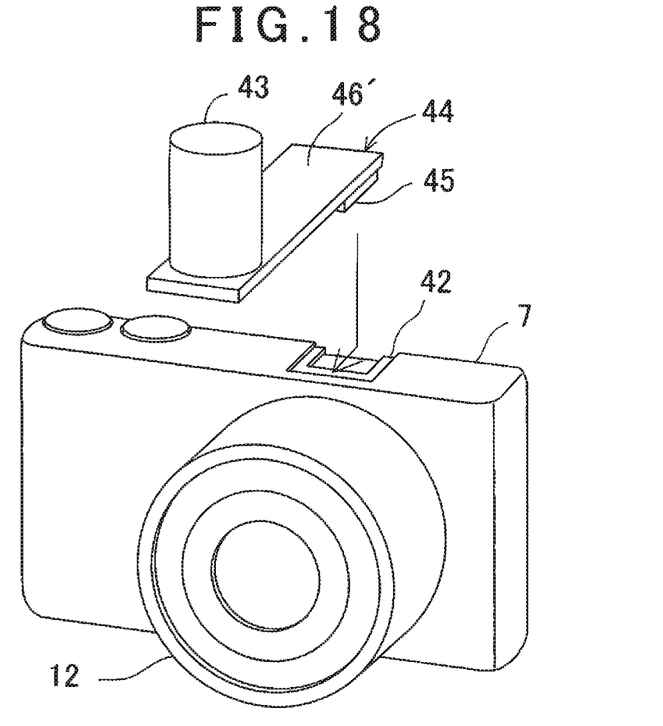
FIG. 18 a perspective view to show a modification of the fifth embodiment of the present invention.
Figure 19:
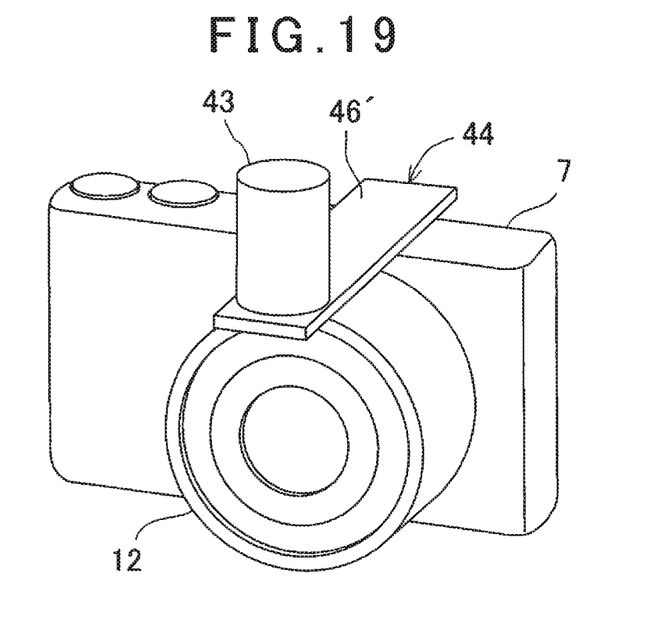
FIG. 19 is a perspective view to show the modification of the fifth embodiment of the present invention.

FIG. 18 and FIG. 19 show a modification of the fifth embodiment. In FIG. 18 and FIG. 19, what are equivalent to components as shown in FIG. 16 and FIG. 17 are referred by the same symbol.

In the modification of the fifth embodiment, also, a prism 43 is mounted by using a hot shoe 42.

An adapter 44 for attaching a prism has a structure in which a fitting portion 45 and a prism holding plate 46' are integrated, and the prism holding plate 46' extends from the fitting portion 45 toward a forward end of a lens holder 12. The prism 43 is fixedly attached to a forward end portion of the prism holding plate 46'.

By fitting the fitting portion 45 with the hot shoe 42, the prism 43 is attached to a camera 7. In a state where the prism 43 is attached, a position of the prism 43 with respect to the camera 7 is set so that a reference position of the prism 43 is located just above an entrance pupil position of the camera 7 in a state where the camera 7 is erect.

In the modification of the fifth embodiment, the prism 43 can be easily attached to/detached from the camera 7. Further, since an offset amount between the reference position of the prism 43 and the entrance pupil position of the camera 7 is small, and there is no shift in an optical axis direction of the camera 7, a measurement of the entrance pupil position can be performed with high accuracy, and in a case where a measurement value is corrected by the offset amount, a calculation becomes easy.

In the present invention, a prism is directly mounted on a camera and further, the prism is attached by using a portion which the camera has. As a result, there is no need to perform a special processing to the camera, and the present invention can be directly put into practice to a commercially available camera.

The invention claimed is:

1. A camera for photogrammetry comprising: a camera, a coupling element standardly provided on said camera, an adaptor which is connectable with said coupling element and added on said camera, and a prism fixed to said adaptor, wherein said coupling element and said adaptor are connected such that said prism is located on an outside surface of said adaptor and said adaptor supports said prism outside said camera and said prism retroreflects an incident light.

2. The camera for photogrammetry according to claim 1, wherein said coupling element is a female screw formed on a forward end inner edge surface of a lens holder of said camera, said adapter for attaching said prism is mounted on a forward end of said lens holder via said female screw, said adapter for attaching said prism has a plane surface orthogonal to an optical axis of said camera, and said prism is fixedly attached to said plane surface.

3. The camera for photogrammetry according to claim 2, wherein a step-up ring or a step-down ring is screwed with said female screw, and said adaptor for attaching said prism is provided via said step-up ring or said step-down ring.

4. The camera for photogrammetry according to claim 1, wherein said coupling element is a hot shoe of said camera, said adaptor for attaching said prism has a fitting portion adapted to be fitted to/detached from said hot shoe and a prism holding plate formed integrally with said fitting portion, and said prism is mounted on said prism holding plate.

5. The camera for photogrammetry according to claim 4, wherein said prism holding plate extends toward the forward end of a lens holder, and said prism is provided on a forward end portion of said prism holding plate.

6. The camera for photogrammetry according to claim 5, wherein a position of said prism is set so that a reference position of said prism is located just above an entrance pupil position of said camera in a state where said camera is erect.

7. A camera for photogrammetry comprising: a camera, a coupling element standardly provided on said camera, an adaptor which is connectable with said coupling element and added on said camera, and a plurality of prisms fixed to said adaptor, wherein said coupling element and said adaptor are connected such that said plurality of prisms are located on an outside surface of said adaptor and said adaptor supports said plurality of prisms outside said camera and said prisms retroreflect an incident light.

8. The camera for photogrammetry according to claim 7, wherein said coupling element is a female screw formed on a forward end inner edge surface of a lens holder of said camera, said adapter for attaching said plurality of prisms is mounted on a forward end of said lens holder via said female screw, said adapter for attaching said prisms has a plane surface orthogonal to an optical axis of said camera, and said prisms are fixedly attached to said plane surface.

9. The camera for photogrammetry according to claim 8, wherein a step-up ring or a step-down ring is screwed with said female screw, and said adaptor for attaching said prisms is provided via said step-up ring or said step-down ring.

10. The camera for photogrammetry according to claim 9, wherein said prisms are disposed at an equal angular pitch on a circumference around said optical axis of said camera as a center.

11. The camera for photogrammetry according to claim 8, wherein said prisms are disposed at an equal angular pitch on a circumference around said optical axis of said camera as a center.

12. The camera for photogrammetry according to claim 7, wherein said coupling element is a lens holder of said camera, said adapter for attaching said prisms has a cylindrical shape fitted with said lens holder, and said prisms are provided in plural at an equal interval on an outer peripheral surface of said adaptor for attaching said prisms.

13. A camera for photogrammetry comprising: a camera, a coupling element standardly provided on said camera, an adaptor which is connectable with said coupling element and added on said camera, and micro prisms fixed to said adaptor, wherein said coupling element and said adaptor are connected such that said micro prisms are located on an outside surface of said adaptor and said adaptor supports said micro prisms outside said camera and said micro prisms retroreflect an incident light.

14. The camera for photogrammetry according to claim 13, wherein said coupling element is a female screw formed on a forward end inner edge surface of a lens holder of said camera, said adapter for attaching said microprisms is mounted on a forward end of said lens holder via said female screw, said adapter for attaching said micro prisms has a plane surface orthogonal to an optical axis of said camera, and said micro prisms are fixedly attached to said plane surface.

15. The camera for photogrammetry according to claim 14, wherein a step-up ring or a step-down ring is screwed with said female screw, and said adaptor for attaching said micro prisms is provided via said step-up ring or said step-down ring.

16. The camera for photogrammetry according to claim 15, wherein said micro prisms are disposed on an entire surface of said plane surface.

17. The camera for photogrammetry according to claim 14, wherein said micro prisms are disposed on an entire surface of said plane surface.

* * * * *